United States Patent
Mangan et al.

(10) Patent No.: US 7,574,694 B2
(45) Date of Patent: Aug. 11, 2009

(54) METHOD FOR APPLICATION AND INFRASTRUCTURE RATIONALIZATION

(75) Inventors: Thomas N. Mangan, Alpharetta, GA (US); Reinier J. Aerdts, Plano, TX (US); Steve Macari, Granite Springs, NY (US)

(73) Assignee: Electronic Data Systems Corporation, Plano, TX (US)

( * ) Notice: Subject to any disclaimer, the term of this patent is extended or adjusted under 35 U.S.C. 154(b) by 833 days.

(21) Appl. No.: 10/952,542

(22) Filed: Sep. 28, 2004

(65) Prior Publication Data

US 2006/0095309 A1 May 4, 2006

(51) Int. Cl.
*G06F 9/44* (2006.01)

(52) U.S. Cl. ............... 717/123; 717/124; 717/126; 714/38

(58) Field of Classification Search ............... None
See application file for complete search history.

(56) References Cited

U.S. PATENT DOCUMENTS

2004/0015907 A1* 1/2004 Giel et al. ............... 717/141
2005/0198486 A1* 9/2005 Desmond et al. ............... 713/1

* cited by examiner

*Primary Examiner*—Chuck O Kendall
(74) *Attorney, Agent, or Firm*—Munck Carter, P.C.

(57) ABSTRACT

A method for application rationalization to assist clients in reducing the complexity of information technology (IT) and expedite the benefits of IT transformation. One exemplary application is described using the disclosed methodologies within the communications industry.

14 Claims, 7 Drawing Sheets

METHOD FOR APPLICATION AND INFRASTRUCTURE RATIONALIZATION

TECHNICAL FIELD OF THE INVENTION

The present invention is directed, in general, to information technology management and, more specifically, to application and infrastructure rationalization.

BACKGROUND OF THE INVENTION

Typically, storage and server consolidation provide potential quick-hit opportunities for many clients. Rationalization is the process of looking at and analyzing an application portfolio or system infrastructure to judge its strengths and weaknesses, to eliminate redundant or unused components, and to combine components in such a way as to ensure a cost-effective solution. Application rationalization is required to drive beyond the low hanging fruit for maximum benefits, including operational, engineering, and utilities strategies. From a business perspective they align with the three key levers for businesses: cost effectiveness, revenue growth, and improved customer service.

There is a need in the art for an improved method for application and infrastructure rationalization.

SUMMARY OF THE INVENTION

Various embodiments provide a method for application rationalization to assist clients in reducing the complexity of information technology (IT) and expedite the benefits of IT transformation. One exemplary application is described using the disclosed methodologies within the communications industry.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Preferred embodiments include a method for application rationalization to assist clients in reducing the complexity of information technology (IT) and expedite the benefits of IT transformation. One exemplary application is described using the disclosed methodologies within the communications industry.

Typically, storage and server consolidation provide potential quick-hit opportunities for many clients. Application rationalization is required to drive beyond the low hanging fruit for maximum benefits, including operational, engineering, and utilities strategies. From a business perspective they align with the three key levers for businesses: cost effectiveness, revenue growth, and improved customer service.

One disclosed approach to application and infrastructure rationalization, applicable to the communications industry and others, focuses primarily on cost reduction and redirection of these savings to other more value aligned areas within the overall business strategy. This approach is in line with a recent study that showed that between 75 and 90 percent of Information Technology budgets are allocated to the ongoing operations of the infrastructure. This breakdown implies that between 10 and 25 percent of the IT budget is available for new opportunities and creating future business value, including new application development.

Preferred embodiments include a process and methodology used to first identify those applications that are appropriate candidates for rationalization and then to perform the actual rationalization of those applications onto more appropriate hardware and software environments.

According to an A.T. Kearney global survey of CEOs, "37% of surveyed executives consider technology alignment with business strategy and integrating existing technology to be the strategic issue of most concern." Based on the rapid changing nature of regulatory requirements, consolidation, and technology roll-out in the communications industry, it is not surprising that alignment of technology with the business needs, especially from an application perspective.

Operational strategies include reduction of operational cost in the form of rationalization, centralization, consolidation, leverage of skills, and technology deployment. Engineering strategies include replacement of technology diversity and complexity with standard, leveraged, integrated solutions. Utilities strategies include optimization of resource utilization, delivery time, flexibility, recoverability, leading to a utility computing environment.

A preferred approach towards application rationalization in the communications industry (and others) is to manage the application scope and complexity through industry process-based models. The enhanced Telecom Operations Map™ (eTOM) is the standard process-based business process framework used by service providers and their suppliers within the communications industry, describing the enterprise processes required by a service provider and analyzing them to varying levels of detail according to their significance and priority for the business.

One embodiment uses the eTOM process model to aggregate individual applications into meaningful business functions for analyzing and making recommendations. These individual applications are cataloged and costed into the various process and sub-process levels within the eTOM process-based model for analysis and creating recommendations. In most client environments, the industry standard eTOM process model requires customization to meet the specific client business processes and organization structures. An example of this will be discussed later in this paper under the case study.

This embodiment organizes the project team into various business process work streams for each high-level business process category defined (which include telecommunication industry, application rationalization methodology, and cross-functional experts) and performs the following tasks:

Develop an application strategy to determine the long-term set of applications to best support the business Prioritize opportunities based on the financial baseline Review work stream opportunities with the client to ensure agreement and build support Develop detailed financial analysis and implementation plan as input to the business case According to the disclosed embodiments, maximum client savings can often be achieved through a combined IT and business process aligned approach.

Most corporations have a large installed base of hardware, software, and (proprietary) applications that run all (or part) of their critical business functions. As all investments in information technology (IT) will either provide a technology or business benefits, it is critical that most of the investments are recaptured in the form of true business benefits. Typically, the more mature an IT organization is, the more business value will be derived from the investments in IT.

Some of the major inefficiencies that drive incremental cost across many industries include:

Misalignment of IT Activity to Corporate Strategy—In the past technology deployment occurred for the sake of technology. In the current business environment, technology deployment is driven by business needs. However, due to the legacy applications in the corporate environments and rapidly changing business requirements to stay competitive, there is still a misalignment of IT strategy to the corporate (business) strategy.

Lack of Effective Business or IT Governance—In almost every business, the IT costs usually form a big component of the overall expense of a corporation. It is critical that these expenses are managed and controlled effectively at a corporate level. As such, the existence of a business-level IT governance function-responsible to oversee the allocation of funds for IT and determine the business value derived from these investments—is a critical function that needs to be in put in place.

Proliferation of Applications—As the number of applications grows, so does the complexity. This complexity is derived from the interconnectivity between these disparate systems, as well as the operational aspects related to the management of the systems.

Duplication of Functionality, Systems and Support Infrastructure—As the number of systems and applications increases (either through growth or acquisition), the amount of functions and subsystems that are duplicated will increase. This duplication amounts to additional infrastructure resource usage in the form of data storage, processing needs, and support staff.

Inappropriate Enhancement and Use of Systems—In many organizations, individual departments still have the authority to make changes or enhancements to systems that will carry a corporate-wide impact: a result of the silo mentality that came about in the 1960s and 1970s. At the same time, this type of mentality also leads to an inappropriateness of use of those systems, as these systems are optimized for departmental use, possibly resulting in corporate-wide degradation of the overall IT infrastructure.

Operations Performed in Silos—Even though information technology has come a long way since the 1960s, a large portion of information and data processing still occurs in silos. This silo mentality leads to duplication and inefficiencies in processing, potentially leading to client impact due to incomplete and difficult to reconcile information. No single version of the truth exists within the enterprise.

Fragmented Information Architecture—In most corporations, a true enterprise architecture does not exist. Oftentimes, a department-level architecture exists, but no work is performed to tie these individual architectures together in a true enterprise-wide architecture. As a result, the overall information architecture is fragmented at best, and in many instances the architecture does not exist at all: buying decisions are made based on the vendor-of-the-day selections, resulting in true fragmentation of the architecture, and operational complexities.

As a result of these inefficiencies, many corporations do not derive the maximum benefits from the investments in infrastructure and information technology components. Through the use of processes like server and storage consolidation and rationalization combined with application rationalization, a company will make significant strides towards information technology efficiency and improved IT and business alignment.

Based on the Information Technology (IT) challenges outlined above, it is critical that an IT transformation takes place.

This IT transformation takes into account the infrastructure (hardware, software, and networks), as well as the applications. The rationalization of these two areas as a single entity provides a corporation with the greatest benefits.

Figure 1:
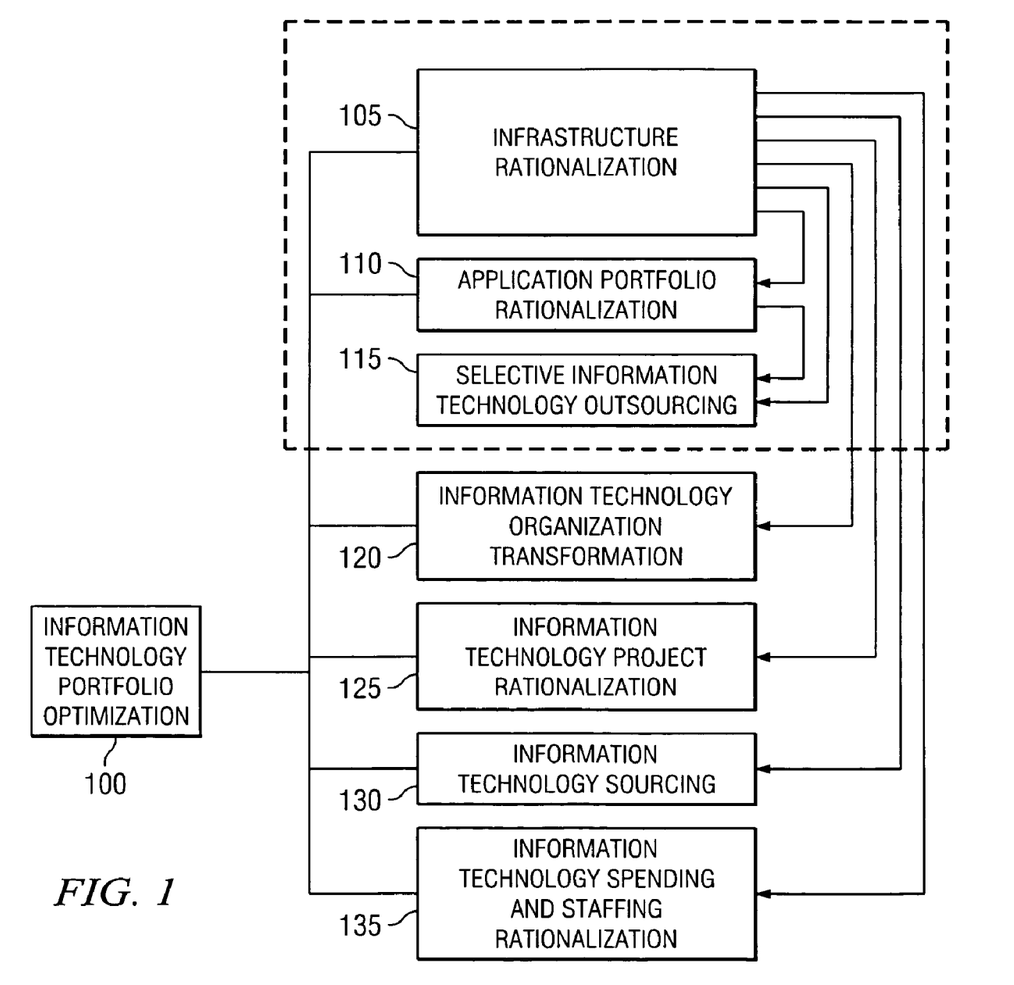
FIG. 1 depicts IT Portfolio Optimization Interdependencies in accordance with an embodiment of the present invention.

In general, Information Technology (IT) Portfolio Optimization consists of a series of rationalization approaches to optimize and improve the economics of IT. These series of rationalization approaches include an end-to-end view of IT and consist of seven major dimensions, as illustrated in FIG. 1. It is important to notice that IT Portfolio Optimization is a process that contains several dimensions, each of which is interdependent on the others.

FIG. 1 depicts IT Portfolio Optimization Interdependencies in accordance with an embodiment of the present invention. Some of the major characteristics for each of these categories of information technology portfolio optimization 100 are as follow:

Infrastructure Rationalization 105—This component is the first in the optimization process, as it focuses on the foundation of the applications: the infrastructure, where some of the quick hits can be achieved. The Infrastructure Rationalization component addresses the following: optimize current assets, leveraging capacity across the various business needs; Quantify the savings that could be achieved by moving to off-shore infrastructure support; and consolidate disparate servers, storage, network, and support infrastructures across the enterprise.

Application Portfolio Rationalization 110—This component heavily relies on the infrastructure rationalization component and focuses on the application areas and addresses the following: Eliminate low value business applications and associated support costs; consolidate redundant applications, functionality and support; and quantify the savings that could be achieved by moving to off-shore application support.

Selective IT Outsourcing 115—As more companies are moving "back to their roots" and focus on their core business, outsourcing non-core components of the business is a growing trend. From an IT perspective, two major areas are affected: for infrastructure, assess internal IT capabilities and spend with industry norms and alternative service (including, but not limited to data center, network, telecom, desktop, and help desk services); and for applications, identify legacy or non-core business applications that can be outsourced to allow internal IT resources to be reallocated to higher value efforts. The key is to identify opportunities that improve service levels, while cost target are achieved.

IT Organization Transformation 120—Changing and overhauling an IT infrastructure and environment can only be successful if the supporting organization, processes, and procedures change at the same time to reflect the IT changes. The IT organization transformation address the following components: establish consistent processes for support, delivery and new projects; define governance model, ensuring clearly defined roles and responsibilities; and identify alternative organizational models that better align to business needs.

IT Project Rationalization 125—At a more detailed level, all individual projects that support the transformation need to be identified, prioritized, rationalized, and staffed. More precisely, the tasks involved in the IT project rationalization activity include: prioritize projects across the enterprise to optimize the IT investment portfolio and maximize returns/benefits; rationalize to eliminate discretionary or low value initiatives; and accelerate benefits where possible.

IT Sourcing 130—The infrastructure and application rationalization will result in a different mix of hardware and software needed to support the business. This change implies that the following areas need to be addressed: assess external spend on IT products and services; centralize vendor negotiations and management; consolidate total enterprise spend to gain negotiating leverage with vendors; and define complimentary IT partnership model.

IT Spending and Staffing Rationalization 135—As the infrastructure and application rationalization gets grounded within the organization, it is critical that the IT spend and staffing requirements reflect the updated infrastructure and IT environment. As such, the following areas are addressed during this phase: assess IT spending and staffing against appropriate industry benchmarks; and determine areas to reduce IT base spending and redirect to higher value areas.

The preferred embodiments have particular advantages in application and infrastructure rationalization and the use of selective IT outsourcing to improve the economics of IT.

The preferred embodiments take a phased approach, towards Application and Infrastructure Rationalization, with key deliverables and implementations at specific points in time to reap the value as soon as possible and throughout the process.

One embodiment of the application and infrastructure rationalization approach focuses on delivering value through a series of implementation waves approximately every 3 to 6 months. The purpose of this waved implementation approach is to use the early savings to invest in more capital intense areas to improve. The process can be described as a four-phased approach, as illustrated in FIG. 2.

Figure 2:
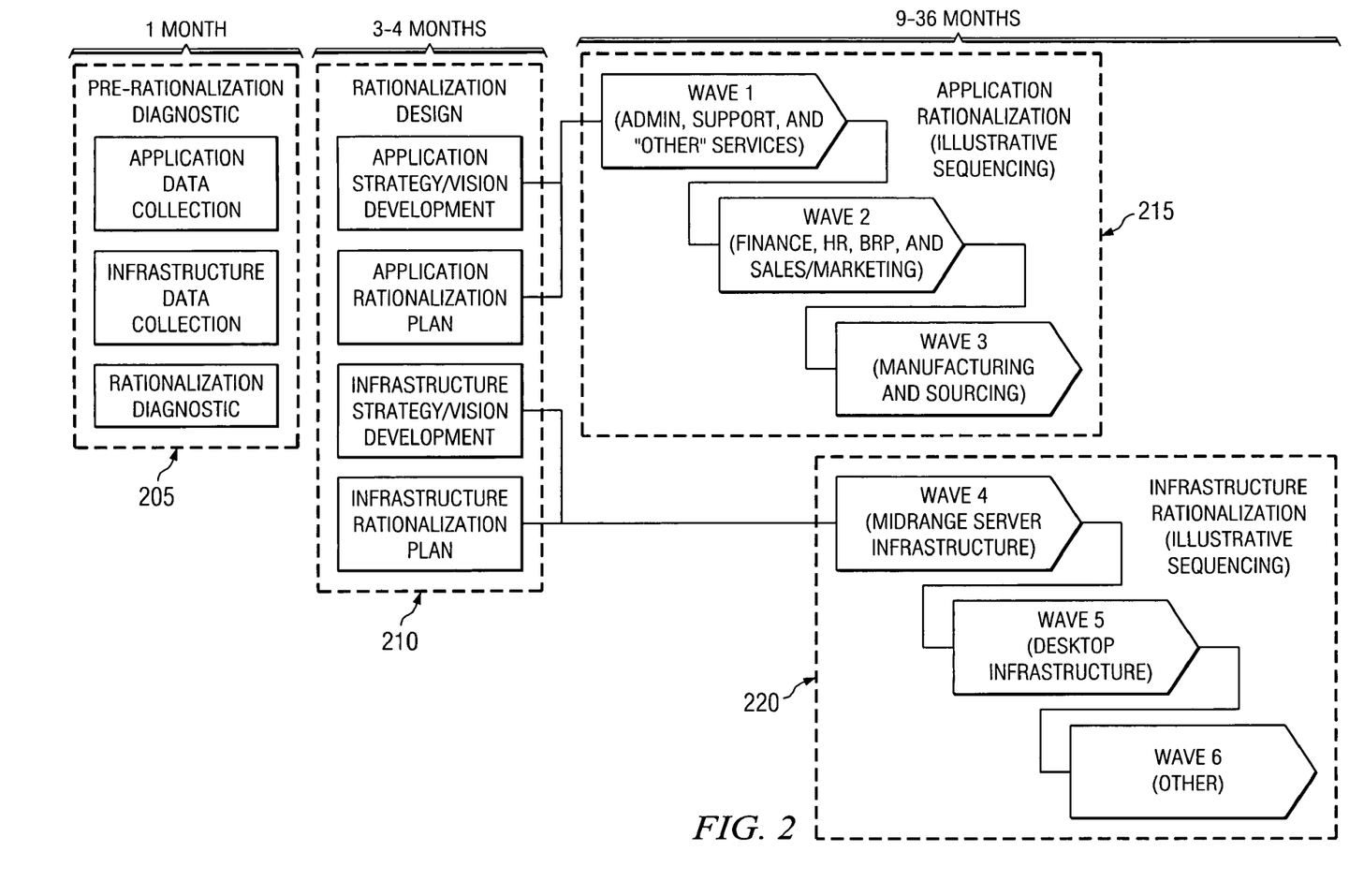
FIG. 2 shows an illustration of an application and infrastructure rationalization approach in accordance with a preferred embodiment.

FIG. 2 shows an illustration of an application and infrastructure rationalization approach in accordance with a preferred embodiment.

Phase I—The Pre-Rationalization Diagnostic phase 205, preferably one month duration, focuses on scoping out the opportunities, collecting data on infrastructure and applications, and setting of improvement targets.

Phase II—The Rationalization Design phase 210, preferably three to four months duration, focuses on the creation of the "to be" state (including a detailed view of the current applications and infrastructure portfolio) and a detailed plan on how to get there. This phase focuses on two separate areas simultaneously: infrastructure and applications. Both areas focus on the development of a vision and strategy, while creating a detailed rationalization plan.

Phase III—The Application Rationalization execution phase 215, preferably nine to 36 months duration, focuses on specific categories of applications, in order to drive down portfolio complexity by consolidating functionality, retiring and/or redesigning applications to better align with stated business objective at the lowest possible cost. This phase also provides a natural bridge into infrastructure rationalization by beginning the server decommissioning process.

Phase IV—The Infrastructure Rationalization execution phase 220, preferably nine to 36 months duration, focuses on reducing operations costs by consolidating and pooling hardware resources across data centers, offices, business units, geographies, and product lines.

It is important to notice that during Phase II two simultaneous paths are pursued: the infrastructure and application planning. As these two phases are closely intertwined, considerable interaction between these planning phases occurs, resulting in the capability to have Phase III and Phase IV run more or less concurrently. As the application rationalization usually requires more preparation work, the application rationalization phase is usually initiated slightly earlier than the infrastructure phase.

An Application and Infrastructure Rationalization diagnostic study should be considered as a "front-end" project to a full IT Transformation program that explicitly ties to business value accumulation, this is one key to success in a multi-year change program.

Figure 3:
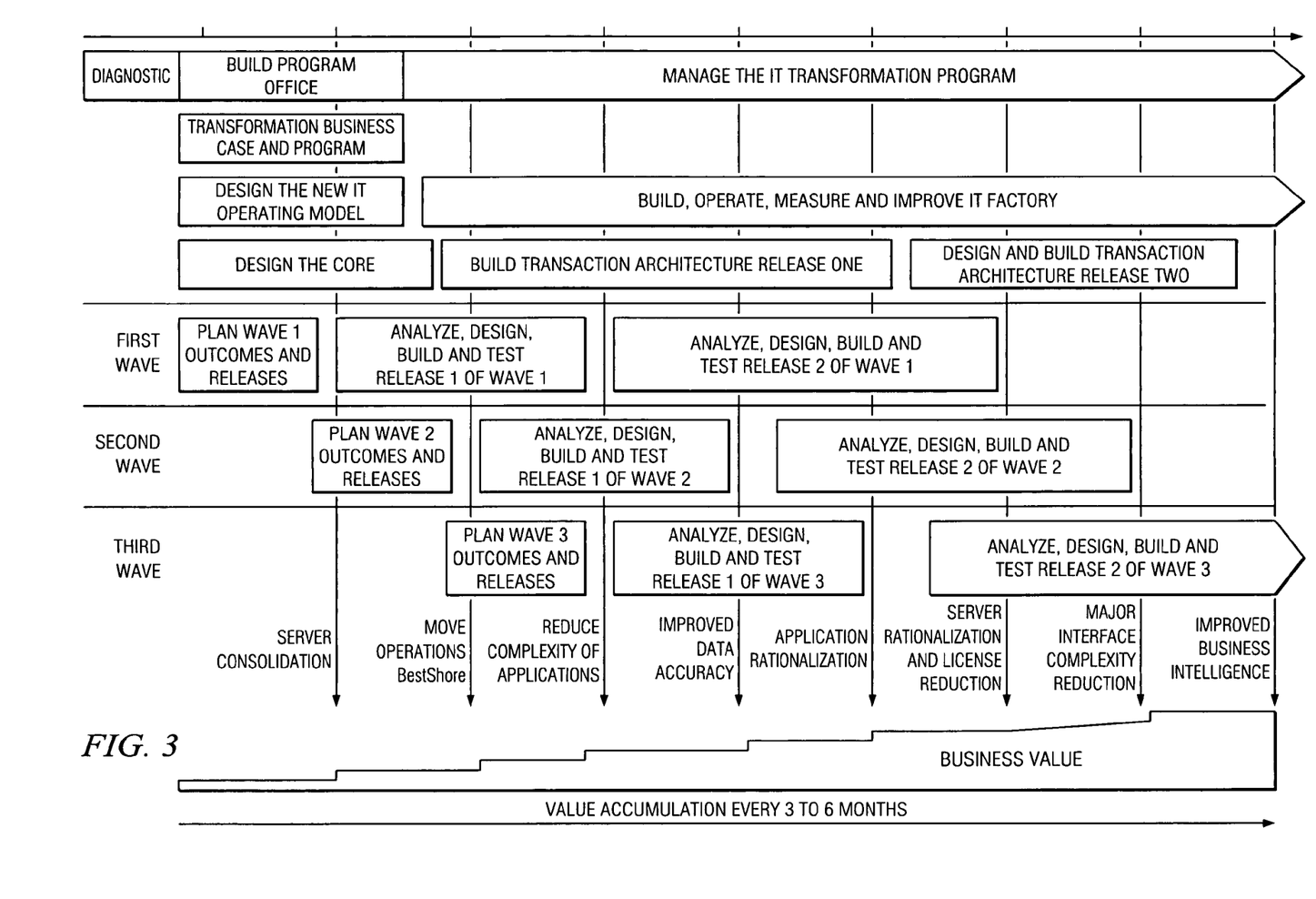
FIG. 3 illustrates application and infrastructure rationalization engagement in accordance with an embodiment of the present invention.

FIG. 3 illustrates application and infrastructure rationalization engagement in accordance with an embodiment of the present invention.

In many cases, a specific program is required to complete the identified activities, due to the scope and impact to the overall business. Many corporations select to initiate an IT Transformation program. A preferred embodiment uses an IT transformation acceleration and optimization program check list, as described herein, to determine the best way to leverage work already completed. A sample timeline for the IT Transformation Acceleration and Optimization Program is shown in FIG. 4 below.

Figure 4:
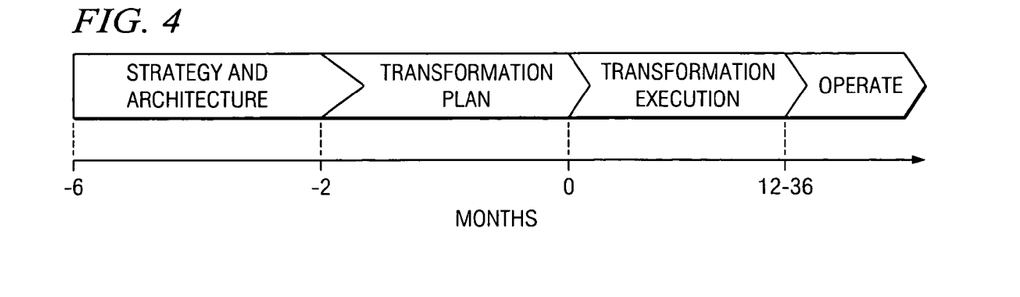
FIG. 4 depicts a sample IT transformation acceleration and optimization program timeline.

FIG. 4 depicts a sample IT transformation acceleration and optimization program timeline.

The major deliverables for each of the four phases (Strategy and Architecture, Transformation Plan, Transformation Execution, and Operate) of the IT transformation acceleration and optimization program, in accordance with a preferred embodiment, are shown in the following table. This list of deliverables can be used as a checklist, as appropriate, in evaluating each step of the process.

| Phase | Major Deliverables |
| --- | --- |
| Strategy and Architecture | Business imperatives for change defined |
| | IT Strategy to support business imperatives defined |
| | Rationalized application strategy for supporting desired state: single suite, legacy, tactical and strategic direction, and niche players |
| | Define process taxonomy for aggregating and evaluating applications across several dimensions: business value, technical capability, functional capability, and cost |
| | Baseline IT spending across process taxonomy |
| | Baseline assessment conduct of current state architectures: process, data, organization, application, and technical |
| | Conception target state architecture |
| | Gap analysis between current and desired state |
| | Comparison of desired state against best practices |
| | Business case for change developed |
| Transformation Plan | Plan developed to implement missing components identified in diagnostic |
| | Overall transformation strategy defined, business case approved and communicated |
| | Target architecture implementation plan developed and funded |
| | Governance structure designed for transformation |
| | Program Management Office (PMO) established and operational |
| | Transformation program plan developed |
| | High priority workstreams defined, prioritized and sequenced |
| | Self-funding business case developed |
| | Implementation Partners selected and agreements in place |
| Transformation Execution | Ongoing transformation program managed |
| | Application architecture built |
| | Technical architecture built |
| | Data architecture build |
| | Process architecture implemented |
| | Organization structure implemented |
| | Skills required to support new environment acquired or developed |
| | Strategic applications are implemented and used across the enterprise |
| Operate | Legacy applications are sunsetted, eliminated, or defined as niche to support unique business functional in a lower-cost operating model |
| | New financial baseline measurement system in place |
| | Key Performance Indicators (KPIs) defined and scorecard implemented |
| | New operational model operational |
| | Service Level Agreements (SLAs), Operating Level Agreements (OLAs), and reporting requirement in place |
| | Target state environment be managed |
| | KPIs and financial scorecards monitored and managed |
| | IT Portfolio ongoing maintenance process in place |

Figure 5:
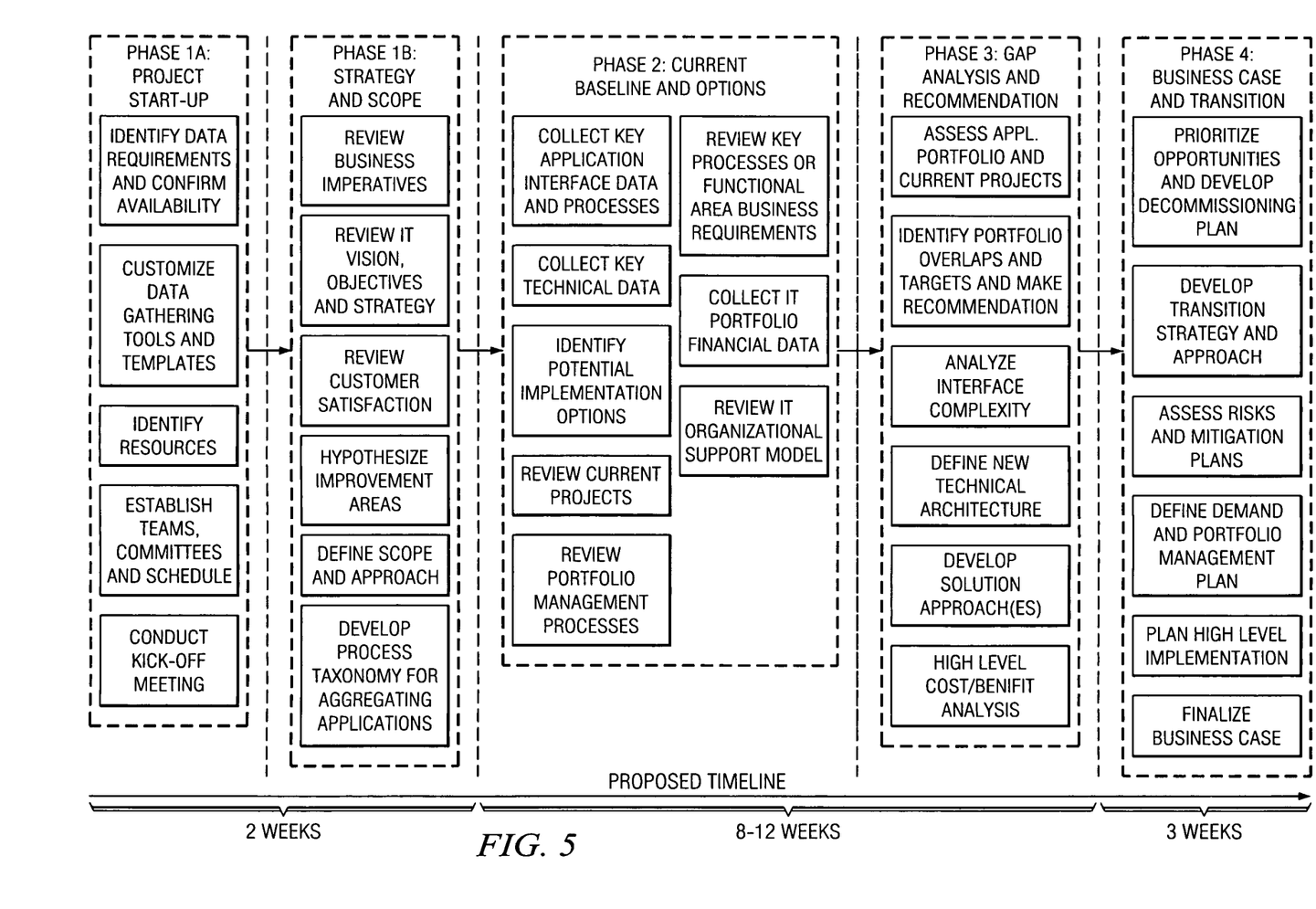
FIG. 5 depicts an exemplary IT Portfolio Diagnostic in accordance with a preferred embodiment.

Tools and Techniques: Before a complete IT Portfolio Rationalization can occur, a complete portfolio view needs to be created that can then be optimized and rationalized. A typical three-to-four month diagnostic is shown in FIG. 5 below. An approach like this critical to defining the exact scope and articulating a clear path towards an IT Portfolio Rationalization approach.

FIG. 5 depicts an exemplary IT Portfolio Diagnostic in accordance with a preferred embodiment. This diagnostic takes into account four major dimensions: business value, technology value, risk, and cost. Following are the major steps in and deliverables from each of these four phases, in accordance with a preferred embodiment.

The major steps of phase 1A, project start-up, include identify data requirements and confirm availability, customize data gathering tools and templates, identify resources, establish teams, committees and schedule, and conduct a kick-off meeting.

The major steps of phase 1B, strategy and scope, include review business imperatives, review IT vision, objectives, and strategies, review customer satisfaction, hypothesize improvement areas, define scope and approach, and develop process taxonomy for aggregating applications.

The major deliverables of phases 1A and 1B are a customized data collection templates surveys and interview guides, a customized application grouping taxonomy for application classification and aggregation for analysis, a project schedule, a project kick-off meeting, and an agreed-upon scope and approach. The customized templates, as discussed herein, include information such as that listed in the tables herein, and the activities, deliverables, and participants for client review, as discussed below, customized as necessary for the particular client and industry.

The major steps of phase 2, current baseline defined, include collect key application interface data and processes, review key processes or functional area business requirements, collect key technical data, collect IT Portfolio Financial Data, review IT organizational support model, review current projects, and review portfolio management processes.

The major deliverables of phase 2 include a documented application portfolio cost model by process-taxonomy levels including total IT cost by application and optionally a total business support cost by defined process-level with taxonomy, a completed Full-Time Equivalent (FTE) survey, IT application support split between sustaining and develop effort, and a completed application value survey to include business value, degree of risk, technical value, and functional value.

The major steps of phase 3, gap analysis and recommendations, include assess application portfolio and current projects, identify portfolio overlaps and targets and make recommendations, analyze interface complexity, define new technical architecture, identify Potential Implementation Options, develop solution approach(es), and high level cost/benefit analysis.

Major deliverables for phase 3 include a portfolio mapped against dimensions of value from the application value surveys, an analysis of current application suitability and gaps identified, end-state application and infrastructure portfolio recommendations, interface complexity reduction and target architecture opportunities identified, and identification of opportunities for application and associated infrastructure retirement, consolidation, moved to lower-cost alternative.

The major steps for phase 4, business case and transition, include prioritize opportunities and develop consolidation, reengineering, and decommissioning plans, develop transition strategy and approach, assess risks and mitigation plan, plan high level implementation, finalize business case, and define ongoing demand and portfolio management plan.

Major deliverables for phase 4 include portfolio and cost reduction targets, transition plan and strategy for identified opportunities, business cases for transformation with associated cash flows for identified opportunities, and an ongoing demand and portfolio management plan.

OF course, in any of the embodiments discussed herein, the particular steps and deliverables can be modified to fit the particular case or client, and the invention is intended to be defined only by the claims.

Various embodiments consider several options to rationalize applications, including "Applications Consolidation," which identifies, evaluates, and consolidates applications that have similar business functionality to create a common set across the portfolio, "Applications Co-Existence<" which identifies which applications can reside together on the same server to allow physical consolidation of servers, "Applications Re-Engineering," which identifies legacy applications for extension (i.e., enhancements) or renewal (i.e., rewrites) to better meet the requirements of the business environment, and "Applications Decommissioning," which identifies applications that have limited business value and high operational cost that can be eliminated.

Each option is considered during the four-phased diagnostic approach (start-up and scoping, develop baseline, assess gaps and develop recommendations, and build transition plan) described above. Each phase takes into account the business and technology value, as well as the risk and cost.

The preferred embodiment also heavily relies upon known processes and tools, including Application Value Analysis, Portfolio Analysis Matrix, Portfolio Strategy Options, Architecture Review, and Transition Strategy, all from EDS Corp. Other similar tools are known to those of skill in the art.

Transformation and Business Process Alignment: One key to an application rationalization approach is a mapping of individual applications to an application portfolio strategy matrix for determining the degree of current state strategy alignment. After identifying the degree of strategy alignment, these applications are mapped to business processes using the customized process taxonomy. Next, an assessment of the technical and functional quality from the business perspective is performed, with specific values assigned to each intersection of application and business function.

Exemplary Case Study: The following describes an exemplary case study for a large telecommunications client.

For a major telecommunication client, the disclosed process was used to develop a plan and business case to reduce the number of business applications and reduce the IT cost position. Applications within the following business process areas were analyzed: Customer Care, Billing, Network Support Systems, and Enterprise Support Systems.

The engagement was divided into four phases using, for example, 18 consultants for a duration of 18 weeks. The focus was on high cost areas across approximately 2,300 applications.

The client drivers included: eliminate low value business applications and associated support costs; consolidate redundant applications, functionality and support; and quantify the savings that could be achieved by moving to off-shore support.

Figure 6:
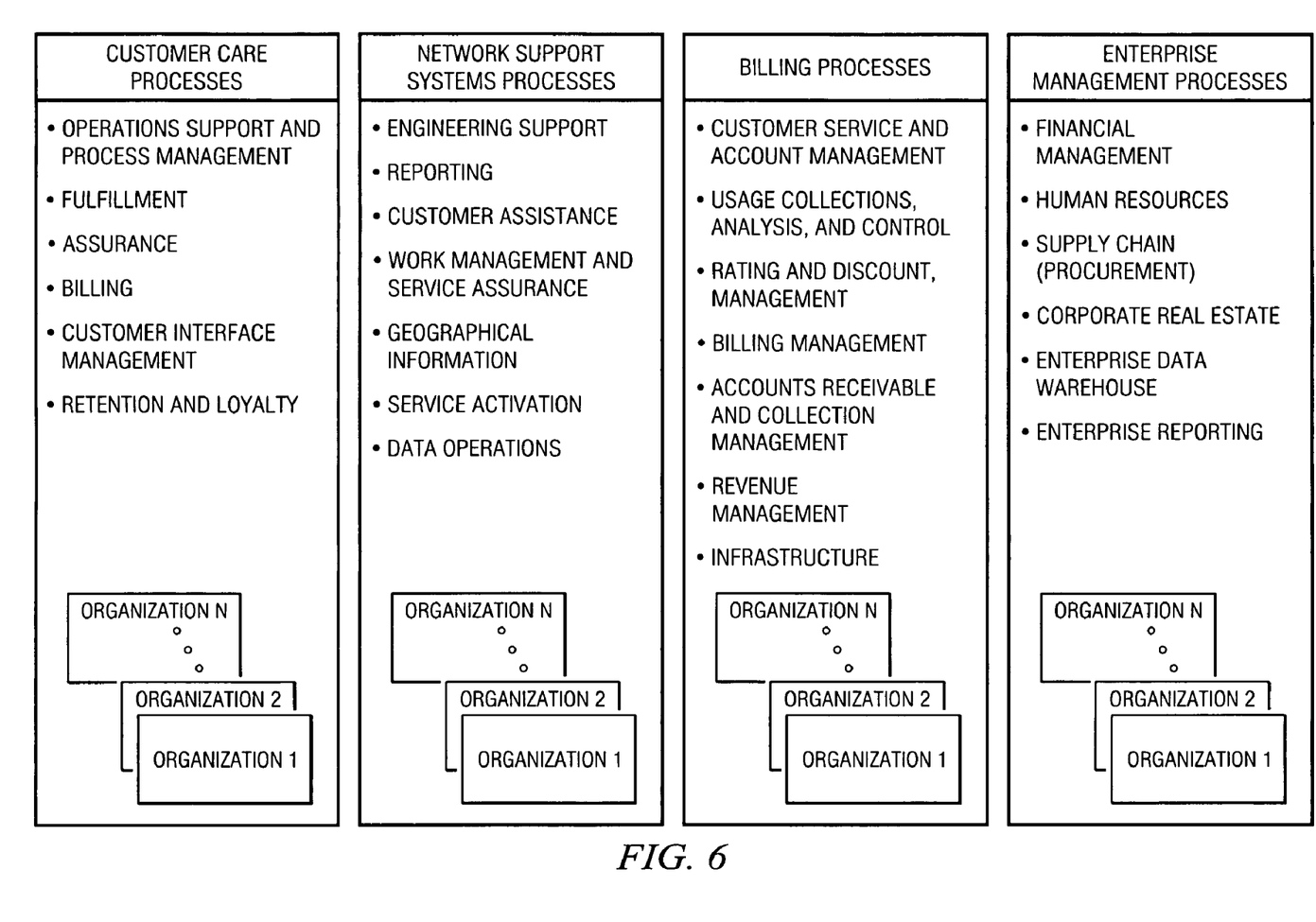
FIG. 6 depicts an exemplary eTOM-based process model approach, and accordance with an embodiment of the present invention.

According to the disclosed processes, an approach to managing the application scope and complexity is to use the eTOM-based process model to aggregate individual applications into meaningful business functions for analyzing and making recommendations, as shown in FIG. 6, below. eTOM, the Enhanced Telecom Operations Map, as known to those of skill in the art, functions as a taxonomy for activities that are done by various roles in a service provider organization. The eTOM describes the full scope of business processes required by a service provider and defines the key elements and how they interact, creating a guidebook that is fast becoming the common business language of the telecom industry.

FIG. 6 depicts an exemplary eTOM-based process model approach, and accordance with an embodiment of the present invention.

The exemplary eTOM-based process model uses a seven-phase approach: catalog, manage, strategize, prioritize, review, analyze, and link.

For the catalog phase, in this example, the approach focuses on individual applications which are cataloged and costed into levels within the eTOM-based process model for analysis and creating recommendations:

| Area | Functional Taxonomy Breakdown |
|---|---|
| Customer Care | Operations Support and Process Management |
| | Fulfillment |
| | Assurance |
| | Billing |
| | Customer Interface Management |
| | Retention and Loyalty |
| Network Support Systems | Engineering Support |
| | Reporting |
| | Customer Assistance |
| | Work Management and Service Assurance |
| | Geographical Information |
| | Service Activation |
| | Data Operations |
| Billing | Customer Service and Account Management |
| | Usage Collection, Analysis, & Control |
| | Rating & Discount Management |
| | Billing Management |
| | Accounts Receivable and Collections Management |
| | Revenue Management |
| | Infrastructure |
| On-line Support/ Infrastructure | On-line Support—Operations Support & Process Management |
| | On-line Support—Fulfillment |
| | On-line Support—Assurance |
| | On-line Support—Billing |
| | On-line Support—Customer Interface Management |
| | On-line Support—Enterprise |

-continued

| Area | Functional Taxonomy Breakdown |
|---|---|
| | Infrastructure—Operations Support & Process Management |
| Enterprise Support Systems | Financial Management |
| | Human Resources |
| | Supply Chain (Procurement) |
| | Corporate Real Estate |
| | Enterprise Data Warehouse |
| | Enterprise Reporting |
| Other | Other applications outside of IT Department Support |

For the manage phase, the preferred process uses engagement workstreams that include industry, process, and cross-functional experts, aligned in a project and program management structure. It is critical that executive oversight is in place and that project managers and advisors, as well as subject matter experts are available. The cross-functional teams consist of an architecture and a project support team. The Architecture team consists of solution architects, technology architects, data architects, and integration architects. The Project Support team consists of business analysts and financial modelers.

Figure 7:
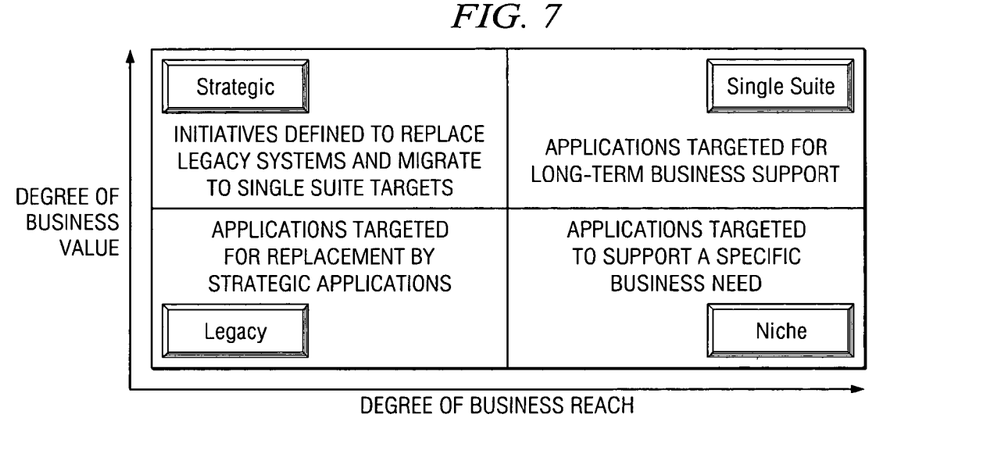
FIG. 7 depicts an exemplary business and process alignment, in accordance with an embodiment of the present invention.

For the strategize phase, the preferred process develops an application strategy to determine the long-term set of applications to best support the business. Each of the applications is categorized into one of four categories—single suite, strategic, legacy, and niche-based on the degree of business value and business reach. FIG. 7 depicts an exemplary business and process alignment, in accordance with an embodiment of the present invention.

In the prioritize phase, each of the identified opportunities is prioritized based on the financial baseline. By using a cost filter against the identified opportunities from the catalog step, each of the opportunities is categorized and prioritized into either the "eliminate" category, which includes all of those applications that are removed from considerations, due to cost, technical, or business issues (such as corporate-wide initiatives), or the "examine" category, that includes all of those applications that are candidates for rationalization, including consolidation, reengineering, decommissioning and lower-cost alternatives. Each one of these categories of candidates is prioritized based on the business value, technical value, risk, and cost.

Figure 8:
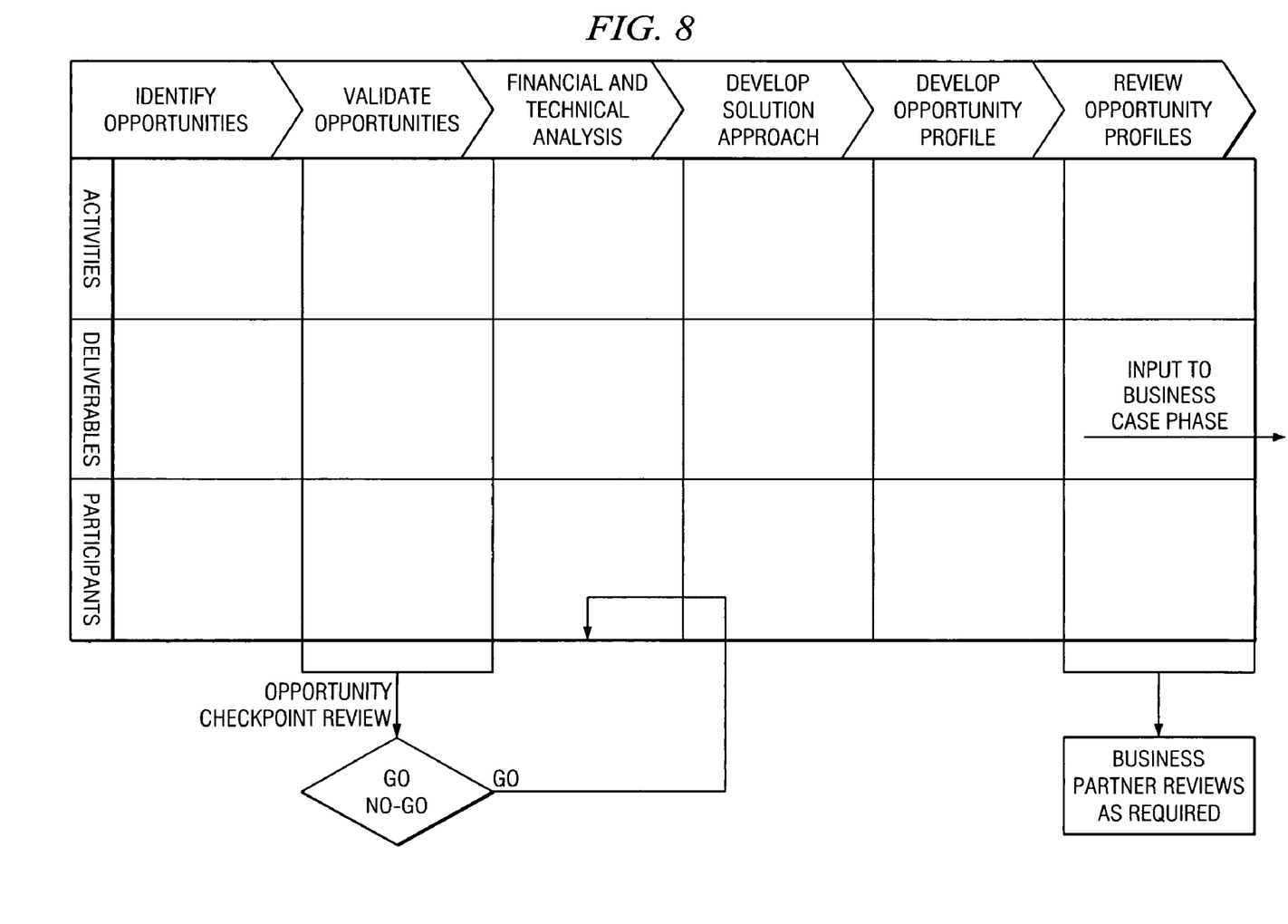
FIG. 8 depicts a high-level view of the process including exemplary activities, deliverables, and participants for client review, in accordance with an embodiment of the present invention.

The review phase consists of a review of the workstream opportunities with the client to build support and ensure agreement. The activities, deliverables, and participants for the review process with the client are described below. FIG. 8 depicts a high-level view of the process including exemplary activities, deliverables, and participants for client review, in accordance with an embodiment of the present invention.

In the analyze phase, for each opportunity, a detailed financial analysis and implementation plan is developed as input to the business case. The business case focuses on two major components: opportunity financials, which addresses cost reconciliation, FTE requirements, implementation cost, and benefits and savings by timeline, leading to the business case, and opportunity profile, which includes the opportunity summary, business and technical assessment, qualitative benefits, net cost and savings, and implementation timeline.

Figure 9:
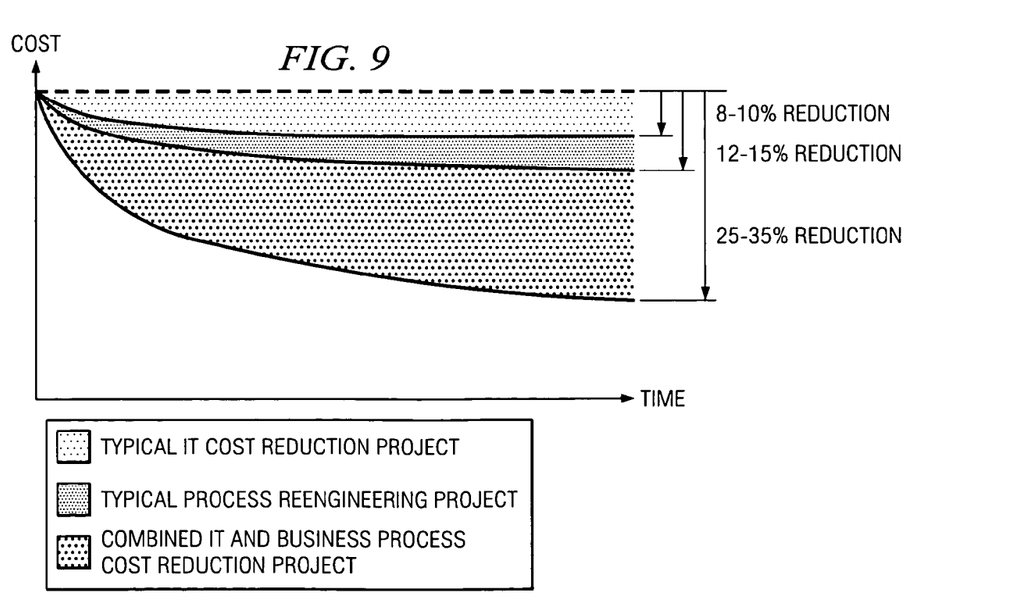
FIG. 9 depicts a sample cost savings scenario, in accordance with this exemplary embodiment.

Finally, in the link phase, the process closely links the IT and business transformation program to provide greater cost reduction returns. It is important to have a single entity (either internal or external) that is accountable for both the IT and business effort in order to streamline the decision-making, to improve the communications, and to minimize the overall project costs. FIG. 9 depicts a sample cost savings scenario, in accordance with this exemplary embodiment.

In the review phase, above, the activities, deliverables, and participants for client review of each task are described below. For the "identify opportunities" task, the activities include analyzing cost data, applying filters to identify high priority opportunities, and reviewing qualitative survey results. The deliverables include identified potential opportunities, and applications slotted to Single Suite categories and addressable spend identified. The participants include the client and the rationalization team.

For the "validate opportunities" task, the activities include interviewing SMEs to validate and narrow the opportunity focus and determining feasibility. The deliverables include disposition and cost of applications, immediate decommission candidates, lower cost candidates, and qualified/agreed opportunities. The participants include the client and the rationalization team, and the SMEs.

For the "financial and technical analysis" task, the activities include reviewing alternatives, conducting technical analysis, and confirming financial data. The deliverables include alternatives considered, an agreed migration approach, and validated savings. The participants include the client and the rationalization team, and the SMEs.

For the "develop solution approach" task, the activities include designing transition plans, identifying solution requirements (hardware, software, FTEs), and identifying all interfaces and dependencies. The deliverables include a draft transition plan, draft implementation costs, and draft savings. The participants include the client and the rationalization team, and the SMEs.

For the "develop opportunity profile" task, the activities include developing opportunity profile documentation. The deliverables include a draft opportunity profile. The participants include the client and the rationalization team.

For the "review opportunity profiles" task, the activities include conducting final reviews with SMEs and conducting a final review with the leadership team. The deliverables include an approved opportunity profile. The participants include the client and the rationalization team, and the SMEs.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A process for application and infrastructure rationalization, comprising:
   performing a pre-rationalization diagnostic;
   creating a rationalization design according to to pre-rationalization diagnostic;
   performing an application rationalization according to the rationalization design; and
   performing an infrastructure rationalization according to the rationalization design, including transforming the physical infrastructure by consolidating and pulling hardware resources; and wherein the pre-rationalization diagnostic produces at least one of a customized data collection templates surveys and interview guides, a customized application grouping taxonomy for application classification and aggregation for analysis, and a project schedule.

2. The process of claim 1, wherein the application rationalization and the infrastructure rationalization are performed concurrently.

3. The process of claim 1, wherein the pre-rationalization diagnostic includes application data collection, infrastructure data collection, and a rationalization diagnostic.

4. The process of claim 1, wherein the rationalization design includes application strategy development, an application rationalization plan, infrastructure strategy, and an infrastructure rationalization plan.

5. The process of claim 1, wherein the application rationalization considers:

administrative, support, and other services;

finance, human resources, and sales; and manufacturing and sourcing.

6. The process of claim 1, wherein the infrastructure rationalization considers midrange server architectures, desktop architectures, and other data processing system architectures.

7. The process of claim 1, wherein the rationalization design includes a detailed view of current applications and an infrastructure portfolio.

8. The process of claim 1, wherein the rationalization design produces a rationalization plan.

9. The process of claim 1, wherein the rationalization design includes a detailed view of current applications and an infrastructure portfolio.

10. The process of claim 1, wherein the application rationalization includes consolidating functionality of applications.

11. The process of claim 1, wherein the application rationalization includes redesigning applications to align with a business objective.

12. The process of claim 1, wherein the application rationalization includes at least part of a server decommissioning process.

13. The process of claim 1, wherein the pre-rationalization diagnostic considers business value, technology value, risk, and cost.

14. The process of claim 1, further comprising producing at least one of a draft transition plan, draft implementation costs, and draft savings.

* * * * *

UNITED STATES PATENT AND TRADEMARK OFFICE
CERTIFICATE OF CORRECTION

PATENT NO. : 7,574,694 B2 Page 1 of 1
APPLICATION NO. : 10/952542
DATED : August 11, 2009
INVENTOR(S) : Mangan et al.

It is certified that error appears in the above-identified patent and that said Letters Patent is hereby corrected as shown below:

In column 12, line 60, in Claim 1, delete "to to" and insert -- to the --, therefor.

Signed and Sealed this

Twenty-sixth Day of January, 2010

David J. Kappos
*Director of the United States Patent and Trademark Office*